Oct. 18, 1955 C. E. POWELL 2,721,085
WHEELED CARRIER
Filed March 21, 1951 3 Sheets-Sheet 1
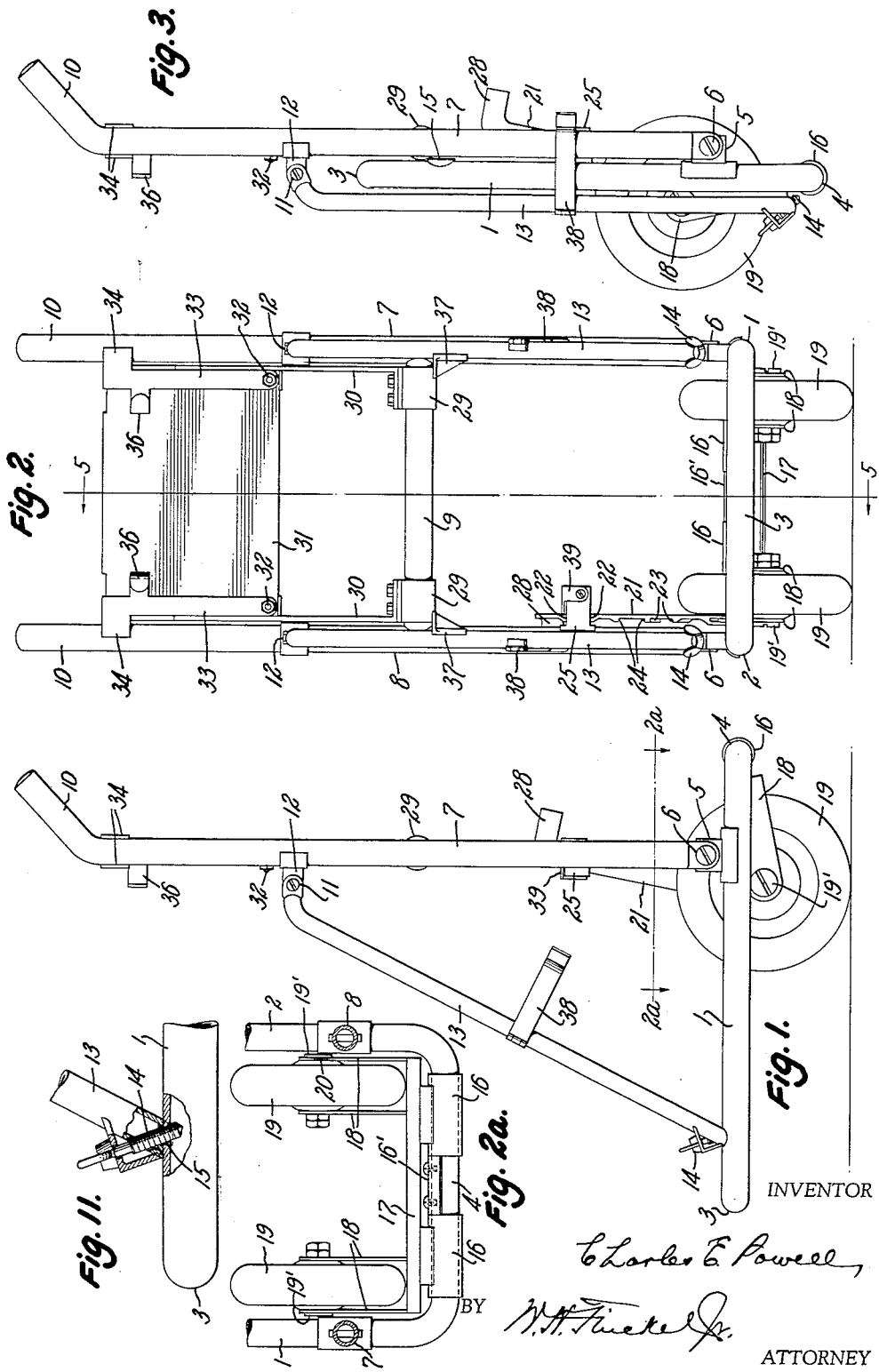

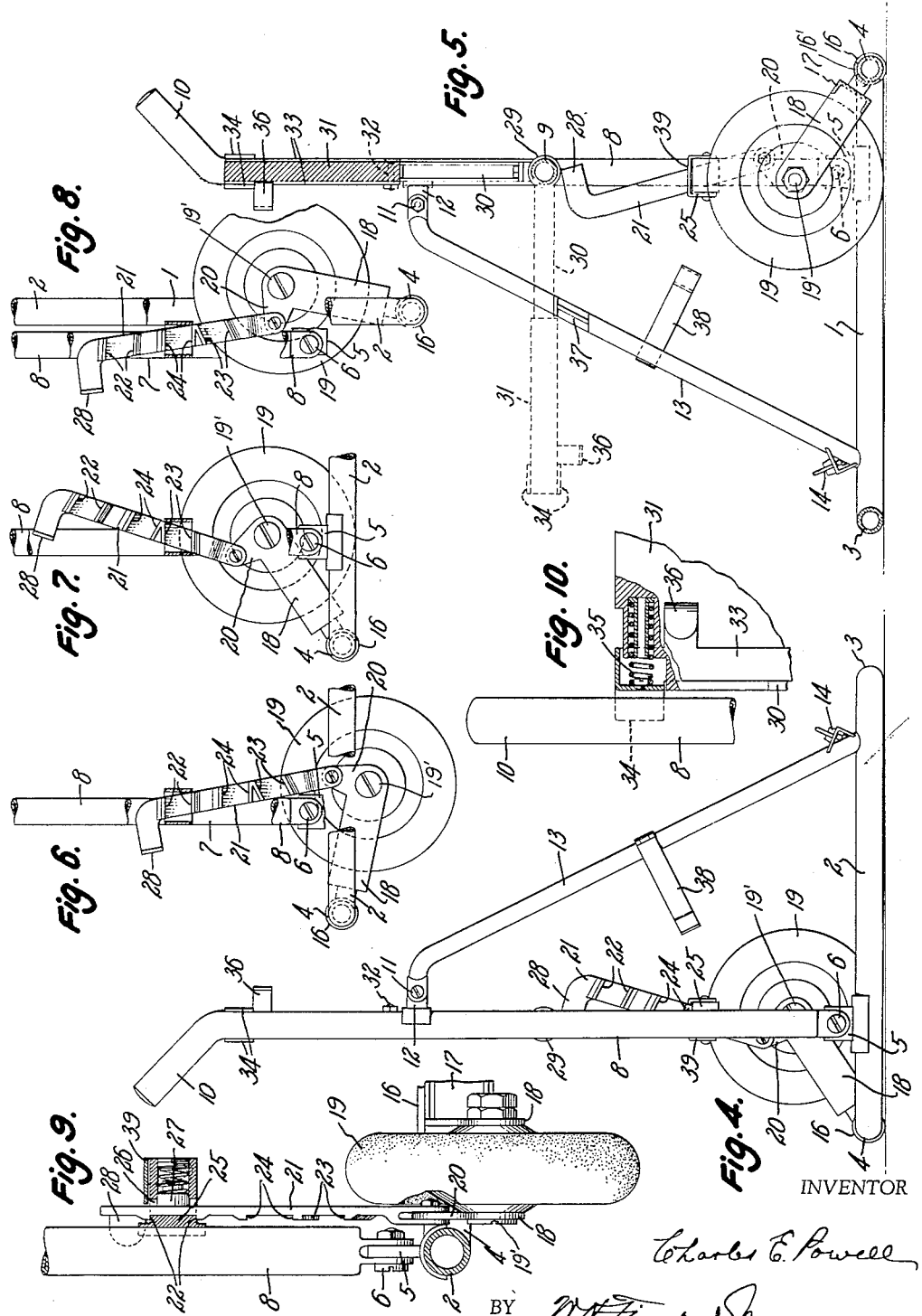

Oct. 18, 1955  C. E. POWELL  2,721,085
WHEELED CARRIER
Filed March 21, 1951  3 Sheets-Sheet 3
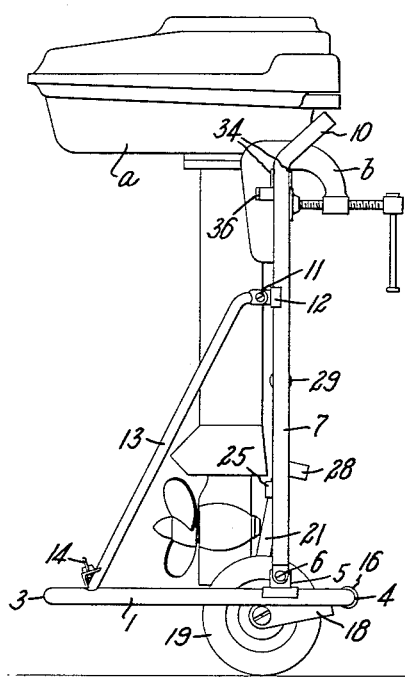
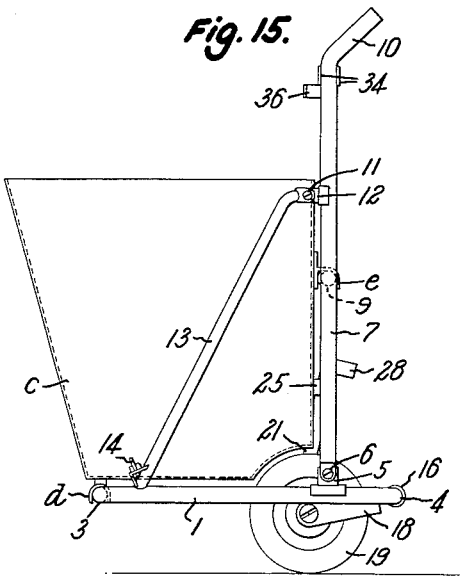
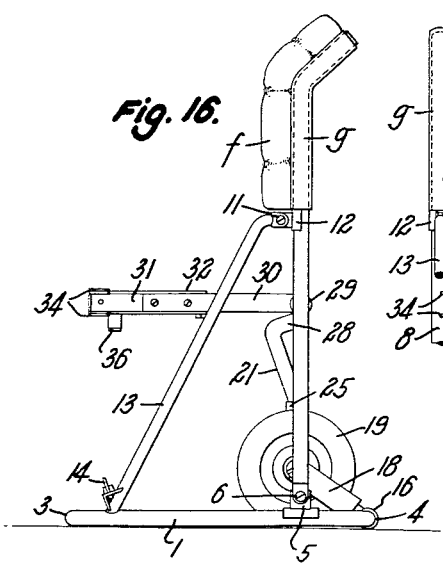
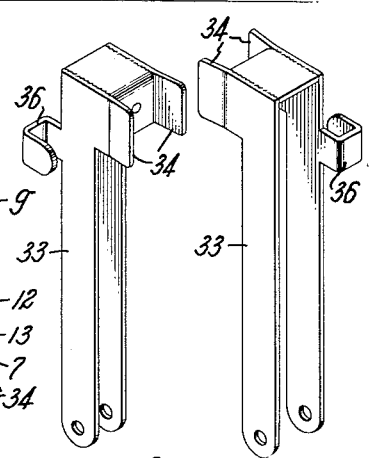
INVENTOR
Charles E. Powell
BY
ATTORNEY United States Patent Office 2,721,085
Patented Oct. 18, 1955

2,721,085

WHEELED CARRIER

Charles E. Powell, Wadsworth, Ohio

Application March 21, 1951, Serial No. 216,697

9 Claims. (Cl. 280—41)

This invention relates to wheeled carriers, and it has special reference to such a carrier designed, primarily, for the transportation, and support when not in use, of outboard marine motors, although it is susceptible of various other uses as will hereinafter appear.

One object of the invention is to provide a wheeled carrier of a collapsible or folding construction which may be easily carried in the hand or transported in a limited space, such as the luggage compartment of an automobile, and which is readily set up for use.

Another object of the invention is to provide a wheeled carrier which has its wheels so mounted that they may assume a plurality of positions with respect to the carrier frame and be secured in such positions, namely for ground contact and travel; out of ground contact to accommodate the carrier to its use as a support; and collapsed or folded condition of the carrier.

A further object is to provide a wheeled carrier having a panel to which the clamps of an outboard marine motor may be secured for transportation or storage, said panel being adjustable also to provide a seat in the carrier frame to adapt the carrier for use as a chair.

Still another object of the invention is to provide a special latching arrangement for the wheel means to insure their predetermined fixed adjustment relatively to the carrier frame.

A further object is to provide special latching means for the frame panel whereby it may be rigidly maintained as a support but may be released for use as a seat.

A still further object is to provide strut means for the frame whereby the frame may be rigidly supported in erected condition and readily collapsed and folded.

With these and other objects in view, as will later appear, the invention comprises a wheeled carrier having a base structure of open frame form with wheel supporting means adjustably mounted thereon, interconnected upright members pivotally secured to said base structure and terminating in handles or grips, strut means separably associated with said base structure and upright members, means for adjustably securing said wheel supporting means relatively to said base structure, a panel member pivotally supported by said upright members, and means for relatively adjusting these parts for use and storage, all as will be explained hereinafter more fully and finally claimed.

In the accompanying drawings illustrating the invention, in the several figures of which like parts are similarly designated, Fig. 1 is a side elevation of the wheeled carrier of the invention with its parts in relative adjustment for its use as a transporting device, Fig. 2 is a front elevation (viewed from the left of Fig. 1) of the carrier, Fig. 2a is a fragmentary, sectional top plan view of the base structure taken substantially on the line 2a—2a of Fig. 1, the latch mechanism being omitted, Fig. 3 is a side view of the carrier in collapsed or folded condition, Fig. 4 is a side elevation of the carrier (viewed from the opposite side from that shown in Fig. 1) showing the parts in position to furnish rigid ground support, Fig. 5 is a sectional elevation taken substantially upon the line 5—5 of Fig. 2, and showing, in broken lines, the panel member in position to provide a seat, Figs. 6, 7 and 8 are fragmentary sectional elevations illustrating the three desired relative arrangements of the wheel structure and frame parts and the latching means for maintaining such arrangements, Fig. 9 is an enlarged fragmentary sectional elevation illustrating details of the latching means for the wheel structure, Fig. 10 is an enlarged fragmentary sectional elevation showing details of the latching means for the panel or support member, Fig. 11 is an enlarged fragmentary sectional detail of the means for releasably securing the strut means to the base structure, Figs. 12 and 13 are enlarged front and rear perspective views of one of the latch members for the panel member, Fig. 14 is a side elevation (to a reduced scale) of the carrier with an outboard marine motor supported thereon, the parts of the carrier being in relative arrangement for transportation of such motor, Fig. 15 is a view similar to Fig. 14 but showing the carrier supplied with a receptacle or container for converting it into a garden wheelbarrow or the like, Fig. 16 is a side elevation showing the carrier with its parts in arrangement to provide a chair and supplied with a back cushion, and Fig. 17 is a fragmentary front elevation of the parts shown in Fig. 16.

The carrier has an open, substantially rectangular, base structure comprising similar side members 1 and 2 and front and rear end members 3 and 4, all preferably formed of an appropriate bent length of relatively light weight metal tubing, such as thin-wall steel tubing, with its ends joined. Secured to the side members 1 and 2 adjacent to the rear member 4 are similar pivot ears 5 to which are pivotally attached by bolts 6 upright members 7 and 8 joined intermediate their ends by a rigid cross brace 9 (Figs. 2 and 5) and terminating in handles or grips 10.

Pivoted by bolts 11 to ears 12 carried by the upright members 7 and 8 are struts 13 the lower ends of which are detachably secured by wing bolts 14 in screwthreaded engagement with reinforcing and locating buttons 15, and with the walls of the side members 1 and 2, the buttons preferably being applied to the members 1 and 2 by brazing (Figs. 3 and 11). The upright members 7 and 8, cross brace 9 and strut members 13 may, like the base frame, all be made of thin-wall steel tubing or other appropriate light weight metal tubing.

Pivotally mounted on the rear base member 4 by sleeves 16, and fixedly located axially of the member 4 by a rigidly applied plate 16', is a wheel mount comprising a cross members 17 (Figs. 2a and 5) provided with bearing yokes 18 in which the wheels 19 are rotatably mounted upon axle pins 19'.

Preferably formed as a part of the yoke or fork 18 adjacent to the upright member 8 (Figs. 2, 4, 5 and 6 to 9) is an ear 20 to which is pivotally connected a latch bar 21 having spaced pairs of latching lugs 22, 23 and 24 for cooperation with a latch plate 25 on the upright member 8. The latch bar 21 extends through a slot 26 in the housing of the latch plate 25 and is forced toward the latch plate 25 by a spring-pressed plunger 27, and carries at its upper end an operating handle member 28. Thus the two wheels being rigidly interconnected by their joint mount 17—18, adjustment of the latch bar, as will later be explained, will serve to adjust both wheels simultaneously and hold them in desired adjustment.

Secured by pivot bearings 29 (Figs. 2 and 5) to the rigid cross brace 9 is a pair of arms 30 attached to and carrying between them a panel 31 having pivoted to it at 32 adjacent to its lateral edges a pair of similar latch members 33 (Figs. 2, 10, 12 and 13) having jaws 34 which normally span the upright members 7 and 8 adjacent to their handles or grips 10 to hold the panel member in position aligned with the upright members. As shown particularly in Fig. 10, the latch members 33 are thus positioned by springs 35 socketed in the edges of the panel member, and finger holds 36 are provided by which they may be retracted when desired.

The strut members 13 carry fixed stops or brackets 37 (Figs. 2 and 5) upon which the panel member is supported when in seat-forming position, as shown in Figs. 16 and 17 and as indicated in broken lines in Fig. 5, and these strut members are also preferably provided with clips 38 which will serve to maintain collapsed or folded arrangement of the carrier, as shown in Fig. 3.

Having reference to Fig. 14, it will be seen that an outboard marine motor $a$ may be removably secured by its clamps $b$ to the panel member 31 for easy transportation.

As shown in Fig. 15, a container or receptacle $c$ may be mounted upon the carrier frame members 3 and 9 by clip means $d$ and $e$, respectively, to accommodate the carrier to use as a garden wheelbarrow or the like.

When the carrier is used as a seat or chair, a back cushion or pad $f$ may be employed, such cushion preferably being supported upon the upright members 7 and 8 by appropriate sleeves $g$ secured to its lateral edges.

As will readily be understood from the foregoing description, the wheel structure may be so adjusted with respect to the base frame that the wheels 19 may be projected into rolling contact with the ground (Figs. 1, 2, 6, 9, 14 and 15); may be retracted within the base frame so that the carrier is rigidly ground supported (Figs. 4, 5, 7 and 16); or may be folded up within the frame elements when the carrier is collapsed (Figs. 3 and 8). In all three of these positions the locking lugs of the latch bar 21, and the cooperating latch plate 25, come into play to rigidly maintain the chosen adjustment. As shown particularly in Figs. 6, 7 and 8, respectively, the lugs 22 of the latch bar 21 engage the latch plate 25 when the wheels 19 are in rolling contact with the ground; the lugs 23 engage the latch plate when the wheels are retracted within the base frame; and the lugs 24 engage the latch plate when the carrier is folded into collapsed condition. In any of these cooperative engagements of the lugs and the latch plate the holding effort of the spring-pressed plunger 27 may be augmented, and a positive lock provided, by a pivoted locking plate 39 (Figs. 1, 2, 5 and 9).

Furthermore, it will be noted that the locking lugs 24, which hold the wheel structure in proper locked position with respect to the frame, lie intermediate the lugs 22 and 23 which, respectively, serve to hold the wheel structure properly locked in ground-contacting and non-ground-contacting positions, and that, due to this arrangement and to the relative angular positioning of the pairs of lugs upon the latch bar 21 and the varying angularity this latch bar has with respect to the lug-engaging latch plate 25 as the latch bar slides thereover during adjustment of the wheel structure from one to another of its three positions, the locking lugs 24 will not be able to engage the cooperating faces of the latch plate 25 unless the frame is in folded condition, as shown in Figs. 3 and 8. Thus, when the frame is in operative position, as shown in Figs. 1, 2, 4 and 5, the wheel structure may be adjusted from ground-contacting to non-ground-contacting position, and vice versa, without any possible engagement of the lugs 24 with the latch plate 25, and the lugs 22 and 23 thus independently engageable with the latch plate, as is desired.

The marked utility of the wheeled carrier of the invention will be apparent when it is considered that, as hereinbefore pointed out, it may be collapsed or folded (Fig. 3) and transported, along with an outboard marine motor, in the luggage compartment of an automobile, or otherwise, and when the location for use is reached it may be adjusted to wheelable condition, the motor attached to its panel member (Fig. 14), and transportation to the dock, float, beach or the like, easily accomplished. Thereafter, when the motor has been installed in a boat, the carrier may have its parts adjusted to seat or chair form (Figs. 5 and 16) and it may be used in the boat as a seat for fishing or the like, the back cushion or pad $f$ being employed, or not, as desired (Figs. 16 and 17).

Obviously, when the carrier is not in use for the purpose just described, it may serve as a rigid storage rack (Figs. 4 and 5) for the outboard motor, or it may be supplied with the container or receptacle $c$ (Fig. 15) and used as a wheelbarrow.

When the carrier is used with its base member in ground-contacting position, whether for rigidly supporting a motor or for furnishing a seat, it will be apparent that the location of the connections 5 and 6 of the upright members 7 and 8 intermediate the ends of the side members 1 and 2 of the base member will provide a non-tipping or non-tilting support.

In order to fold the carrier to collapsed, easily transportable, condition, it is necessary merely to disconnect the strut members 13 from the side members 1 and 2 of the base frame by unscrewing the wing bolts 14, fold the base frame upwardly against the upright members 7 and 8, the latch bar 21 having been released and reset with its lugs 24 engaging the latch plate 25 (Fig. 8), drop the strut members 13 downwardly about their pivots 11, and snap the clips 38 over the upright members 7 and 8 (Fig. 3), whereupon a compact package will be provided. It will be noted that the wing bolts 14, when disconnected from the side members 1 and 2 of the base frame, cannot escape from the strut members 13 and become lost or misplaced, due to their necked-down formation (Fig. 11).

Various changes and modifications are considered to be within the principle of the invention and the scope of the following claims.

What I claim is:

1. In a wheeled carrier, a frame including a base member of elongated form having side members and at least one end member, a wheel support including crank-like bearing means having at one end thereof pivot bearings for said wheels and its other end adjustably carried by said base member by pivotal connection with said end member and serving to position said wheels inwardly of said base member, a normally upright member associated with said base member and carried by said side members and inwardly thereof from said end member, and cooperating means on said wheel support and upright member for adjusting and maintaining adjustment of said wheel support with respect to said base member.

2. In a wheeled carrier, a frame including a base member of elongated form having side members and at least one end member, a wheel support including crank-like bearing means having at one end thereof pivot bearings for said wheels and its other end adjustably carried by said base member by pivotal connection with said end member and serving to position said wheels inwardly of said base member, a normally upright member associated with said base member and carried by said side members inwardly thereof from said end member, said base member being capable of ground contact to provide a relatively rigid and non-tipping support for said upright member with portions of the side members of the base member extending forwardly and rearwardly of said upright member, and means for adjusting and maintaining adjustment of said wheel support whereby the wheels thereof may be positioned to raise said base member from ground contact or may be positioned to afford ground contact of said base member.

3. A wheeled carrier as claimed in claim 2, in which the upright member is pivotally connected with the base member, whereby these parts may be folded together.

4. A wheeled carrier as claimed in claim 3, in which strut means are pivotally connected with one of said frame members and rigidly attached to the other frame member to maintain a predetermined fixed relation therebetween, the rigid attachment of said strut means being of separable form to permit said folding of the parts including folding of said strut means about their pivotal connection.

5. In a wheeled carrier, a frame structure including normally upright frame members and a base structure connected therewith, a panel member pivotally supported between said upright members and normally extending in alignment therewith, and releasable latch means interposed between said members and panel for maintaining such alignment, said latch means including members pivotally attached to one member of said panel member and upright frame members and provided with jaw means for embracing the other member, said panel member being movable upon its pivot to a position substantially normal to said upright members, and means for supporting said panel member in the last named position.

6. Mechanism as claimed in claim 5, in which the latch means include a member pivotally attached to said panel member at the edge thereof adjacent to an upright frame member and provided with jaw means for engaging said frame member, and resilient means for normally maintaining such engagement.

7. A carrier as claimed in claim 5, in which strut means are arranged between said upright frame members and the base structure, and the means for supporting said panel member in its last named position are carried by said strut means.

8. A wheeled carrier, including a frame structure having a normally upright member and a base member foldably attached to said upright member, a wheel structure pivotally connected with said base member and adjustable with respect thereto to permit the base member to assume any one of three positions, namely in ground contact, supported by the wheel structure out of ground contact, and folded against the upright member; and means for selectively maintaining the wheel structure in predetermined relation to the base member in any one of such positions, comprising a latch bar carried by one of said structures and a latch plate carried by the other structure, said latch bar being provided with three relatively spaced pairs of latch plate engaging lugs, the intermediate pair of such lugs serving to determine the position of the wheel structure when the base member is folded against the upright member and capable of so functioning only when the said members are thus folded, and the other two pairs of lugs serving respectively to position said wheel structure for ground contact and out of ground contact of said base member.

9. Means for adjusting and maintaining adjustment of two parts having a pivotal connection and relatively movable upon such connection and with respect to a third part having a pivotal connection with one of said first named parts and relatively foldable upon its said pivotal connection with respect to said first two parts, comprising a latch bar carried by one of said first two parts and a latch plate carried by said third part, said latch bar being provided with three relatively spaced pairs of latch plate engaging lugs, the intermediate pair of such lugs serving to determine the position of said one part when said first two parts are folded with respect to said third part and capable of so functioning only when said parts are thus folded, and the other two pairs of lugs serving to relatively maintain said first two parts in either one or the other of two predetermined positions.

References Cited in the file of this patent

UNITED STATES PATENTS

| Number | Name | Date |
|---|---|---|
| 552,323 | Langhorne | Dec. 31, 1895 |
| 780,653 | Griffith | Jan. 24, 1905 |
| 1,520,630 | Bateman | Dec. 23, 1924 |
| 1,547,674 | Nelson | July 28, 1925 |
| 1,557,549 | Becker | Oct. 20, 1925 |
| 1,761,683 | Ritchie | June 3, 1930 |
| 2,141,881 | Schray | Dec. 27, 1938 |
| 2,415,392 | Morehouse | Feb. 4, 1947 |
| 2,453,388 | Schramm | Nov. 9, 1948 |
| 2,479,467 | Bryant | Aug. 16, 1949 |
| 2,519,146 | Marshall | Aug. 15, 1950 |
| 2,521,819 | Baer | Sept. 12, 1950 |
| 2,605,117 | Hooz et al. | July 29, 1952 |